United States Patent [19]

Shu

[11] Patent Number: 4,914,931

[45] Date of Patent: Apr. 10, 1990

[54] HANDLE TYPE COMBINATION LOCK FOR A SUITCASE

[76] Inventor: Shung-Chung Shu, 29, Lu-hsin Rd., Din-Tsu Dis., Lu-Kang Township, Chang-Hwa County, Taiwan

[21] Appl. No.: 271,870

[22] Filed: Nov. 16, 1988

[51] Int. Cl.[4] .............................................. B60R 25/02

[52] U.S. Cl. ........................................ 70/213; 70/207; 70/69

[58] Field of Search ................... 70/64, 67, 68, 69, 70, 70/71, 72, 73, 74, 75, 76, 207, 213, 312

[56] References Cited

U.S. PATENT DOCUMENTS

| | | | |
|---|---|---|---|
| 2,637,194 | 5/1953 | Pietri | 70/312 |
| 3,555,860 | 1/1971 | Atkinson | 70/312 |
| 3,756,639 | 9/1973 | Wilkinson | 70/70 |
| 4,228,666 | 10/1980 | Perez-Alonso | 70/67 |
| 4,263,794 | 4/1981 | Sutliff | 70/70 |
| 4,308,732 | 1/1982 | Hau | 70/213 |

*Primary Examiner*—Robert L. Wolfe

*Attorney, Agent, or Firm*—Connolly & Hutz

[57] ABSTRACT

The present invention relates to a novel handle type combination lock for a suitcase, comprises a combination lock housed inside the handle of the suitcase, and the two broadside ends of the handle are provided with respective push buttons, when the combination lock is unlocked, the push buttons can be pushed to move, through this movement they drive respective sliding, plates to move for unlocking the fasteners located on the suitcase adjacent to the left and right side of the handle. The present invention utilizes one combination lock to control two fasteners and housing the combination lock inside the handle for the suitcase which simplifies the structure and reduces the production cost as well as provides good locking functions.

2 Claims, 5 Drawing Sheets

HANDLE TYPE COMBINATION LOCK FOR A SUITCASE

BACKGROUND OF THE INVENTION

In a conventional suitcase, two separate and independent combination locks are provided on each side of the handle for the suitcase. In order to simplify unlocking as well as to avoid confusion, the users are generally setting these two locks with same unlocking combination numbers. From this fact, it can be seen that only one novel lock is actually required, if it can serve both the left and right side locking function it will be more advantageous to the users for its simplicity, practicality, and convenience.

A conventional suitcase can be unlocked to open no matter it is placed in a vertical or horizontal position, but when it is opened in vertical position the articles inside the suitcase will drop out. Therefore, a means to prevent the suitcase from being opened in its vertical position is required. Though there are suitcases marketed which possess this function, they are not widely accepted by the public due to their structural complexity.

The handle of a suitcase is utilized to house the combination lock which controls both the left and right side fastener of the suitcase, to open only when the suitcase is placed in horizontal position, not only serves the above proposes but also reduces the production cost.

SUMMARY OF THE INVENTION

The main object of the invention is to provide a combination lock inside the handle of a suitcase which controls the movement of left and right sliding plates for unlocking the left and right fasteners via left and right push buttons on left and right side of the handle.

Another object of the present invention is to make the push buttons and the sliding plates engageable eccentrically, so that only when the handle is positioned 90° with respect to the suitcase body, the left and right push buttons can actuate the left and right sliding plates for unlocking the left and right fasteners, and therefore the suitcase can be opened only in a predetermined condition.

A further object of the present invention is to use one combination lock to control the left and right fasteners of the suitcase, which not only simplifies the structure, reduces production cost, increases using safety, but only one combination number is required to be remembered.

DETAILED DESCRIPTION OF THE INVENTION

Figure 1:
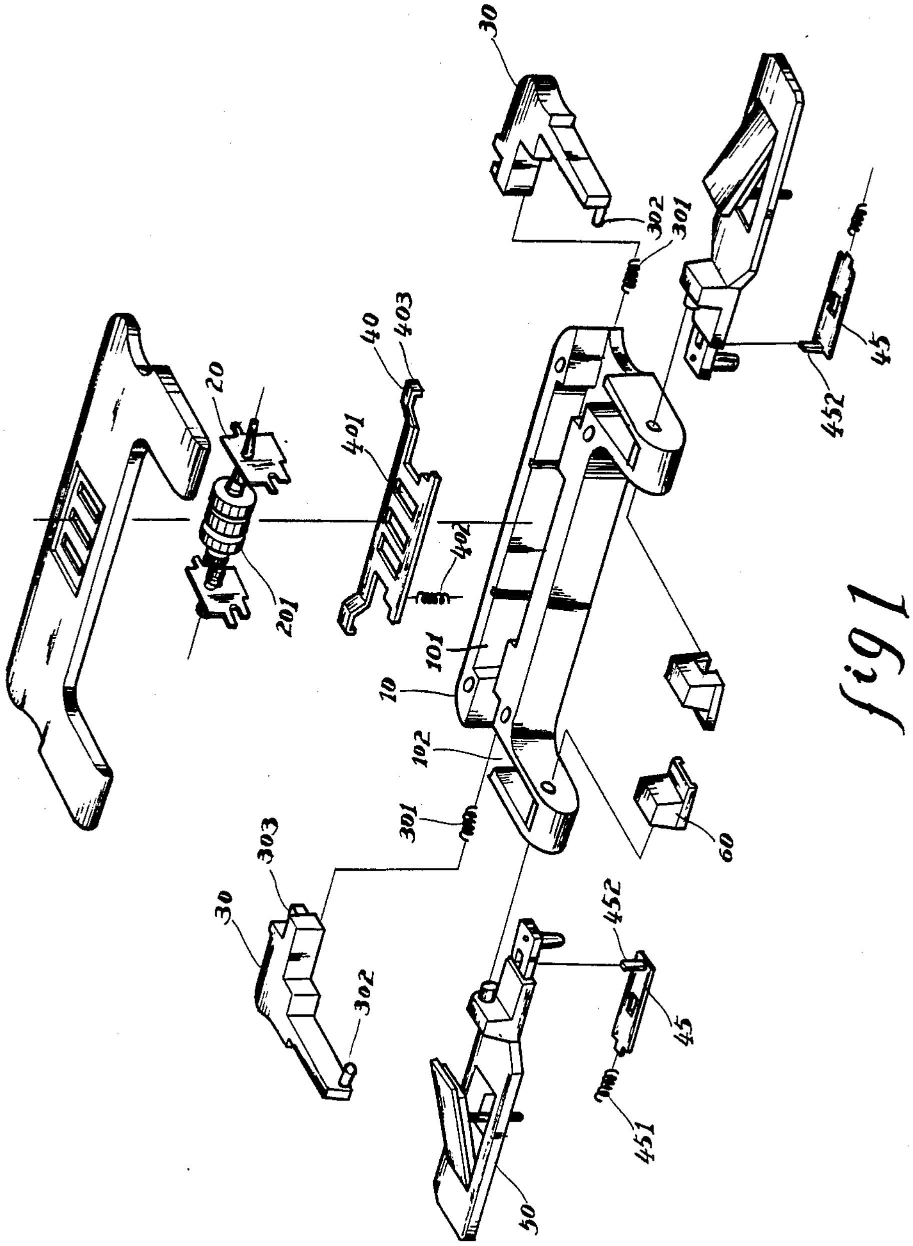
FIG. 1 is an exploded perspective view of the present invention.

Referring to FIG. 1, the present invention comprises a handle body 10, which is an ordinary handle body except it is provided with a trough 101 on its central portion for receiving a combination lock body 20. The lock body 20 is an ordinary combination lock which performs locking, unlocking, and unlocking combination number set resetting function, and it is supported by two compression coil springs 301. Under the combination lock body 20 there is provided a pressing plate 40 having slots 401 for the positioning of the combination lock body 20, and under the pressing plate 40 there is provided up-pushing coil springs 402 for pushing against the pressing plate 40 to allow the two side ends 403 of the pressing plate 40 to be contacted or to be separated from the push buttons 30 as well as to maintain a steady left and right movement of the pressing plate 40 when it is pushed by the left and right push buttons 30. The lower ends of the push buttons 30 are provided with respective bosses 302, which are utilized to push corresponding left and right sliding plates 45 to move when the left and right push buttons 30 are pushed, respectively. Each sliding plate 45 is biased by a coil spring 451 which produces locking and unlocking functions with the fastening lids 501 of the fasteners 50. Handle seats 60, which cover the sliding plates 45, are fastened on the outside wall of the suitcase by screws extending out from the inside which of the suitcase which, preventing the suitcase opening without the utilization of the combination lock.

Figure 2:
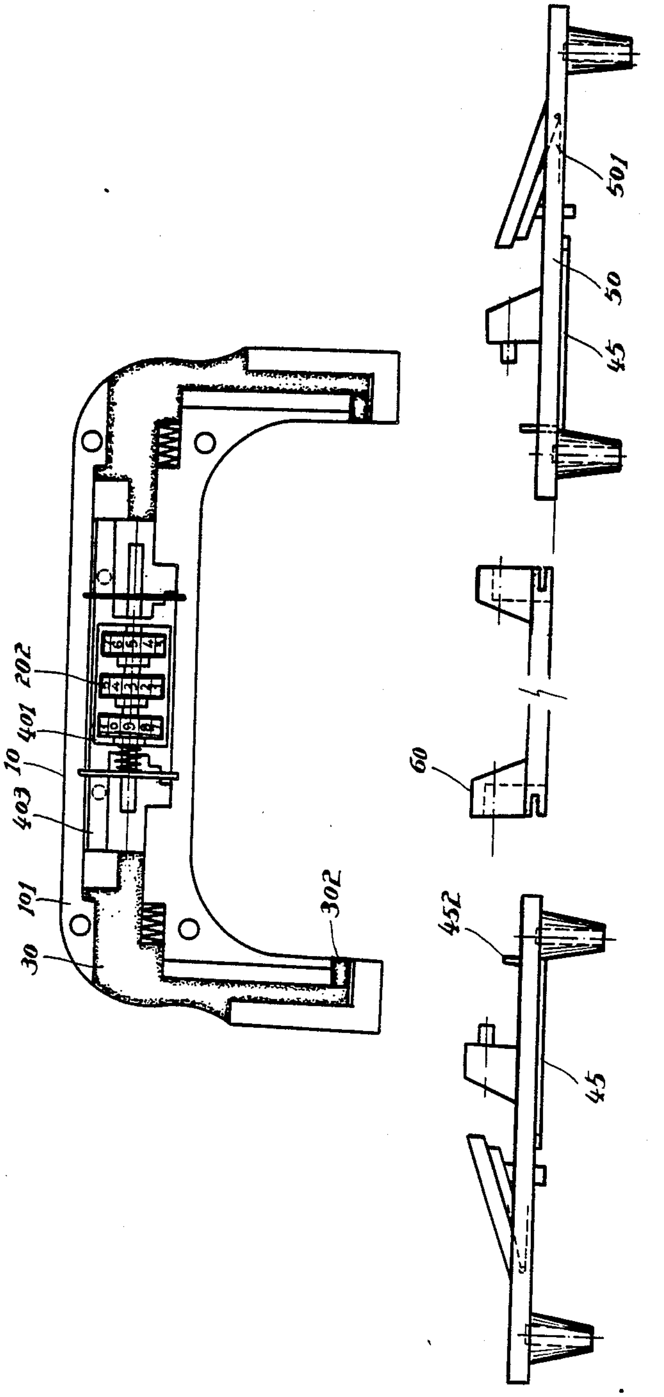
FIG. 2 is an exploded view of a detail of the present invention.

Referring to FIG. 2, the pressing plate 40 is placed first inside the trough 101 of the handle body 10, then. In combination lock body 20 is seated in the slots 401 of the pressing plate 40, in this manner, the two side ends of the pressing plate 40 are making contact with respective push buttons 30. When the numbered wheels 201 are rotated to the correct unlocking combination numbers, the pressing plate 40 allows the push buttons 30 to be pressed. While one of them is pressed to move, the boss 302 on its lower end will drive the protruded end 452 of sliding plate 45 to move in the direction toward its handle seat 60, which disengages fastening lid 501 from fastener 50 and lets the fastening lid 501 jump up to unlock the suitcase. The right side push button does the same thing but is provided with dual functions by two stages of movements. The first stage of movement is used for the opening of the suitcase when the right push button is first time pressed down, when it is pressed down the second time or pressed further down, it goes into the second stage of movement which pushes the ratchet wheels 202 inside the combination lock body to disengage them from the numbered wheels. At this time, the numbered wheels of the combination lock can be rotated independently and freely to the desired unlocking number set for serving unlocking number changing purpose. The slots 401 are used for the positioning of the numbered wheels 201, and both the left and right sides of the pressing plate 40 are extended outwardly to form respective side ends 403. Also under the pressing plate 40 there is provided up-pushing coil springs 402. When the combination lock body 20 is locked up, the pressing plate 40 will be kept down while its two side ends 403 make contact with their respective push buttons 30, and at this time, neither one of the two push buttons can be pressed. When the combination lock body 20 is unlocked, the two side ends 403 of the pressing plate 40 will be moved up and either one of the push buttons can be pressed to move to produce unlocking action for the fasteners 50 via the boss 302 on the lower end of the push buttons pushing the protruded ends 452 of the sliding plates 45.

Figure 3:
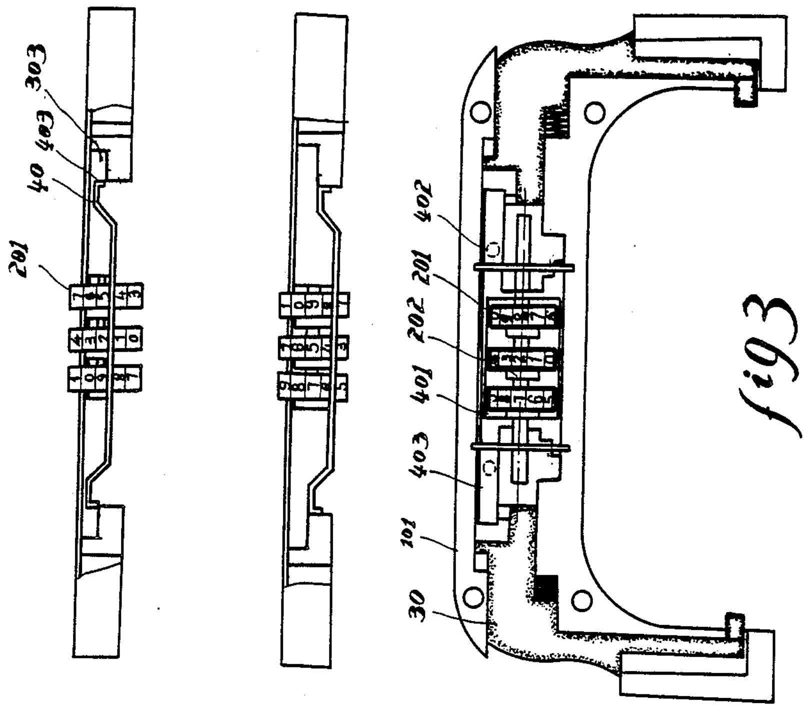
FIG. 3 is the illustrative diagram for the operation of the present invention.
Figure 4:
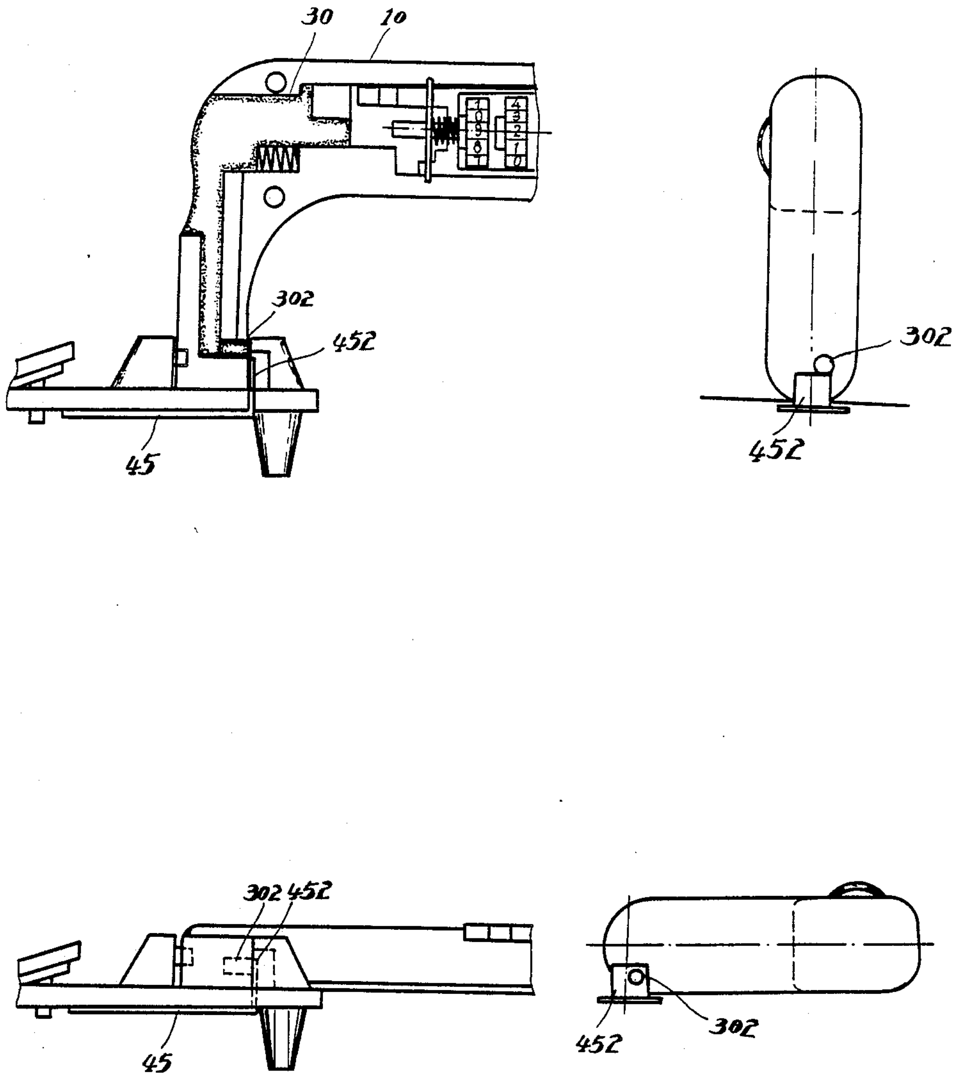
FIG. 4 is the illustrative diagram for the operation of the present invention.

Figs. 3 and 4 show that the handle type combination lock of the suitcase can be unlocked when the broadside bottom of the suitcase is placed on a horizontal surface while the handle of the suitcase is turned vertically or 90° with respect to the horizontal plane. The reason is that when the broadside plane of the handle is parallel to the broadside plane of suitcase, the bosses 302 on both of the push buttons 30 can not make contact with the protruded ends 452 of the sliding plates 45, and in addition push buttons 30 can not be pressed to move. Therefore, if the combination lock 20 is unlocked in this position, the suitcase still can not be opened. However, when the handle is turned 90° with its broadside plane normal to the broadside plane of the suitcase, then, the bosses 302 on both push buttons 30 can make contact with the protruded ends 452 of the sliding plates 45 and can push the sliding plates 45 to move to unlocking positions.

Figure 5:
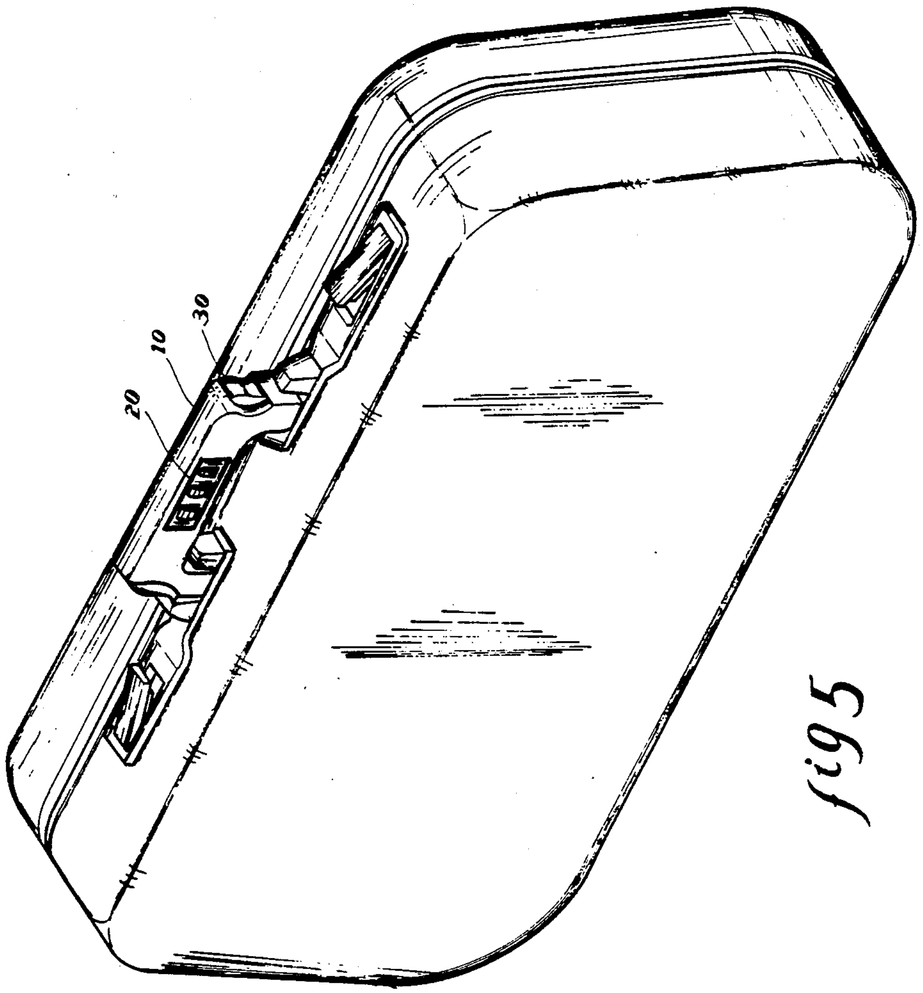
FIG. 5 is a perspective view showing the present invention installed on a suitcase.

Referring to Fig. 5, the combination lock is housed inside the handle body 20, and the left and right sides of the handle body 20 are provided with respective left and right side push buttons 30 for producing unlocking actions, in this manner, a handle type combination lock structure for a suitcase is thus formed, which reduces production cost and has good locking functions.

I claim:

1. A handle type combination lock assembly for a suitcase, comprising a combination lock with an unlocking changeable number wheel set, this combination lock is housed inside the handle of the suitcase with its numbered wheels exposed, a pressing plate inside the handle with left and right ends rested against movable push buttons in the left and right ends of the handle and connected so that when the combination lock is unlocked and the handle is turned 90° with respect to the broadside plane of the suitcase these left and right push buttons can be pushed while bosses on the lower ends of the push buttons will push the protruded ends of sliding plates to unlock locking fasteners adjacent to the left and right sides of the handle.

2. The combination of claim 1 in which the bosses on the lower ends of the push buttons can make contact with protruded ends of the sliding plates only when the handle is turned 90° with respect to the broadside plane of the suitcase, otherwise the suitcase can not be opened.

* * * * *